United States Patent
Leigh et al.

(10) Patent No.: US 10,788,633 B2
(45) Date of Patent: Sep. 29, 2020

(54) COMPLEMENTARY REVERSE ORDER FILTERS

(71) Applicant: HEWLETT PACKARD ENTERPRISE DEVELOPMENT LP, Houston, TX (US)

(72) Inventors: Kevin B. Leigh, Houston, TX (US); Paul Kessler Rosenberg, Palo Alto, CA (US); Sagi Mathai, Palo Alto, CA (US); Wayne Victor Sorin, Palo Alto, CA (US); Michael Renne Ty Tan, Palo Alto, CA (US); Georgios Panotopoulos, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/966,359

(22) Filed: Apr. 30, 2018

(65) Prior Publication Data
US 2019/0331867 A1    Oct. 31, 2019

(51) Int. Cl.
*G02B 6/42* (2006.01)
*H04J 14/02* (2006.01)
*H04B 10/50* (2013.01)
*H04B 10/67* (2013.01)
*H04B 10/25* (2013.01)

(52) U.S. Cl.
CPC .......... *G02B 6/4215* (2013.01); *H04B 10/25* (2013.01); *H04B 10/506* (2013.01); *H04B 10/67* (2013.01); *H04J 14/02* (2013.01)

(58) Field of Classification Search
CPC .... G02B 6/4215; H04B 10/25; H04B 10/506; H04B 10/67; H04J 14/02

USPC .................... 398/79, 43, 42, 138, 95, 85, 87
See application file for complete search history.

(56) References Cited

U.S. PATENT DOCUMENTS

| | | | | |
|---|---|---|---|---|
| 5,696,859 A | * | 12/1997 | Onaka | G02B 6/12007 372/20 |
| 5,835,517 A | * | 11/1998 | Jayaraman | G02B 6/2938 372/50.124 |
| 6,008,920 A | * | 12/1999 | Hendrix | G02B 6/2938 359/633 |

(Continued)

OTHER PUBLICATIONS

Lai, Y. et al., "Bidirectional Nonreciprocal Wavelength-Interleaving Coherent Fiber Transversal Filter", IEEE Photonics Tech Letters, vol. 16, No. 2, Feb. 2004, pp. 500-502.

(Continued)

*Primary Examiner* — Oommen Jacob
(74) *Attorney, Agent, or Firm* — Sheppard Mullin Richter & Hampton LLP

(57) ABSTRACT

In example implementations, an apparatus is provided. The apparatus includes an optical transmission component and an optical reception component. The optical transmission component includes a plurality of lasers and a transmit filter. The plurality of lasers each emit a different wavelength of light. The transmit filter includes a plurality of different regions that correspond to one of the different wavelengths of light emitted by the plurality of lasers. The optical reception component includes a plurality of photodiodes and a complementary reverse order (CRO) filter. The CRO filter includes a same plurality of different regions as the transmit filter in a reverse order.

15 Claims, 4 Drawing Sheets

(56) References Cited

U.S. PATENT DOCUMENTS

| | | | | |
|---|---|---|---|---|
| 6,122,417 | A * | 9/2000 | Jayaraman | G02B 6/2938 372/50.23 |
| 6,198,556 | B1 * | 3/2001 | Mizrahi | H04J 14/0206 14/206 |
| 6,198,864 | B1 * | 3/2001 | Lemoff | G02B 6/29367 385/24 |
| 6,212,312 | B1 * | 4/2001 | Grann | G02B 27/1086 385/24 |
| 6,243,175 | B1 * | 6/2001 | Pelekhaty | H04J 14/0219 398/9 |
| 6,362,904 | B1 * | 3/2002 | Cormack | G02B 6/2713 359/529 |
| 6,462,844 | B1 * | 10/2002 | Kai | H04B 10/25073 398/79 |
| 6,594,045 | B2 | 7/2003 | Liu | |
| 6,769,816 | B2 | 8/2004 | Capewell et al. | |
| 6,819,871 | B1 * | 11/2004 | Baldwin | G02B 5/281 359/634 |
| 7,272,323 | B2 * | 9/2007 | Grann | H04B 10/40 398/135 |
| 7,945,169 | B2 * | 5/2011 | Oki | G02B 6/4246 174/254 |
| 8,036,533 | B2 * | 10/2011 | Hosomi | G02B 6/4215 398/79 |
| 8,537,468 | B1 * | 9/2013 | Wang | G02B 27/0025 359/619 |
| 8,885,992 | B2 * | 11/2014 | Omura | G02B 6/29361 385/14 |
| 8,985,871 | B2 * | 3/2015 | Mizobuchi | G02B 6/43 385/14 |
| 9,136,666 | B1 * | 9/2015 | Norberg | H01S 3/137 |
| 9,178,610 | B1 * | 11/2015 | Chan | H04B 10/2589 |
| 9,225,454 | B1 * | 12/2015 | Liu | H04J 14/02 |
| 9,485,046 | B1 * | 11/2016 | Tang | H04J 14/02 |
| 9,995,880 | B1 * | 6/2018 | Ding | G02B 6/29367 |
| 2002/0025110 | A1 * | 2/2002 | Kersey | G02B 6/2932 385/24 |
| 2002/0076480 | A1 | 6/2002 | Hsieh et al. | |
| 2003/0128922 | A1 * | 7/2003 | Kolodziejski | B82Y 20/00 385/27 |
| 2003/0174423 | A1 * | 9/2003 | Hart | G02B 6/29311 359/889 |
| 2003/0179788 | A1 * | 9/2003 | Wildeman | H04N 7/20 372/20 |
| 2004/0052529 | A1 | 3/2004 | Lauder et al. | |
| 2004/0101247 | A1 * | 5/2004 | Chen | G02B 6/32 385/47 |
| 2004/0141746 | A1 * | 7/2004 | Oberg | H04J 14/0283 14/283 |
| 2004/0188600 | A1 * | 9/2004 | Chapman | H01S 5/0687 250/227.23 |
| 2005/0002672 | A1 * | 1/2005 | Sakai | H04B 10/25073 398/85 |
| 2005/0152640 | A1 * | 7/2005 | Lemoff | G02B 6/2938 385/24 |
| 2006/0088246 | A1 * | 4/2006 | Han | G02B 6/2938 385/47 |
| 2006/0088255 | A1 * | 4/2006 | Wu | G02B 6/2938 385/92 |
| 2007/0242956 | A1 * | 10/2007 | Inui | H04B 10/077 398/177 |
| 2008/0205437 | A1 * | 8/2008 | Cole | H03M 9/00 370/464 |
| 2009/0103923 | A1 * | 4/2009 | Hosomi | G02B 6/4215 398/91 |
| 2010/0002987 | A1 * | 1/2010 | Hata | G02B 6/4204 385/14 |
| 2010/0054751 | A1 * | 3/2010 | Murry | H04J 14/0206 398/137 |
| 2011/0052189 | A1 * | 3/2011 | Yamada | H04J 14/0279 14/279 |
| 2012/0140780 | A1 * | 6/2012 | Chang | H04J 14/08 370/479 |
| 2012/0251120 | A1 * | 10/2012 | McNicol | H04B 10/5161 398/91 |
| 2013/0156431 | A1 * | 6/2013 | Sun | H04J 14/0298 14/298 |
| 2013/0223844 | A1 * | 8/2013 | Hwang | H04B 10/506 398/91 |
| 2014/0363165 | A1 | 12/2014 | Panotopoulos et al. | |
| 2016/0122678 | A1 | 8/2016 | Goodrum et al. | |
| 2017/0017043 | A1 * | 1/2017 | Menard | G02B 6/12007 |
| 2017/0059786 | A1 * | 3/2017 | Lin | G02B 6/3831 |

OTHER PUBLICATIONS

Search Report and Written Opinion received for PCT Application No. PCT/US2019/029897, dated Nov. 22, 2019, 12 pages.

* cited by examiner

COMPLEMENTARY REVERSE ORDER FILTERS

STATEMENT OF GOVERNMENT RIGHTS

This invention was made with government support under Prime Contract No. DE-AC52-07NA27344 awarded by DOE. The Government has certain rights in this invention.

BACKGROUND

Optical communications transmit information over wavelengths of light. One type of optical communications involves wavelength division multiplexing (WDM). WDM multiplexes multiple optical signals on a single optical fiber by being modulated with different carrier wavelengths of laser light to carry different signals.

One type of WDM is a coarse wavelength division multiplexing (CWDM). CWDM uses increased channel spacing to allow less sophisticated, and thus, cheaper transceiver designs. CWDM can be used for a variety of different applications including cable television, fiber optic networks, and the like.

DETAILED DESCRIPTION

Examples described herein provide a complementary reverse order (CRO) filter for coarse wave division multiplexed (CWDM) optical transceivers used in communication systems. The CRO filter may help to reduce the maximum optical signal losses in the CWDM system. For example, a CWDM system may include a transmission side and a reception side. Electrical signals may modulate a carrier wavelength from a laser. A modulated light may be emitted from a laser, travel through a filter, and bounce (e.g., reflect) between a reflector, or reflective surface, and the filter until the light reaches a fiber interface. In one example the reflector may comprise relay lenses where the backside of the relay lenses may be applied with a high reflective (HR) coating. In another example, the reflector may be a total internal reflection (TIR) mirror.

The light may pass through a passive fiber component of the CWDM system until it exits on the reception side. The light may bounce between the reflector and a filter on the reception side until it passes through the filter to the respective photodiode receptor. Each bounce may cause some reduction in the power of the light signal.

The position, or sequence, of the laser devices transmitting each wavelength on the transmission side and the corresponding wavelength reception order, or sequence, of the wavelengths of the photodiode receptors on the reception side may be such that there is a large difference in the optical power losses between the light signals travelling the shortest distance and the light signals travelling the longest distance. For example, in some CWDM systems, the wavelength (e.g., 990 nanometers (nm)) with the longest path through the optical system may have 14 reflections between the transmission side and the reception side. The wavelength (e.g., 1065 nm) with the shortest optical path through the optical system may have only 2 reflections between the transmission side and the reception side.

Examples of the present disclosure provide a CRO filter that reduces the maximum losses in the CWDM system. For example, the CRO filter may reverse the order of the wavelengths of the filter on the transmission side or the reception side. As a result, the optical path length and the combined number of bounces off of the relay lenses and optical filter surfaces, are comparable for optical signals of each wavelength, and therefore the losses may be equal for each wavelength and the maximum losses can be reduced. For example, in a four-wavelength CWDM system the maximum number of bounces may be reduced from 14 to 8, thereby reducing the maximum amount of power loss.

Figure 1:
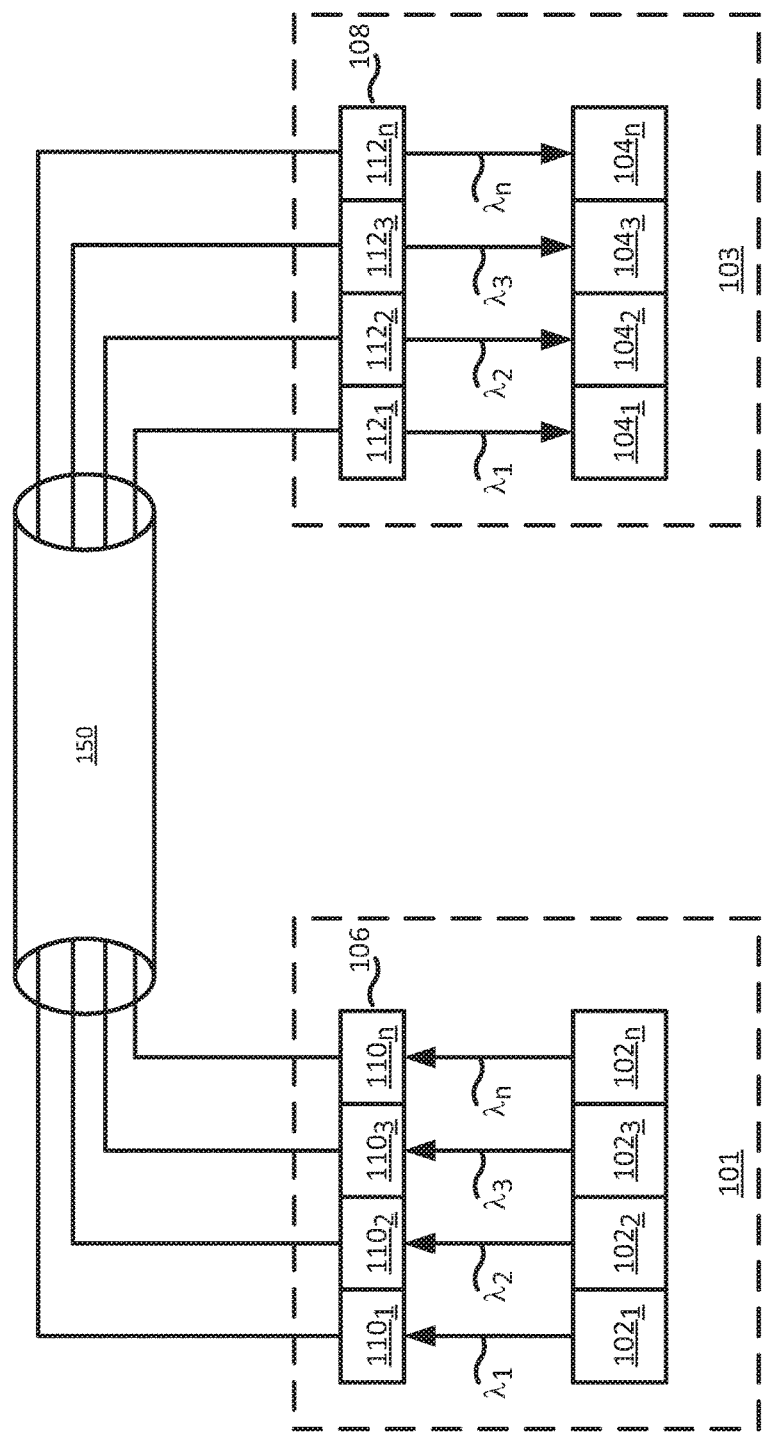
FIG. 1 is a block diagram of an example apparatus having a complementary reverse order (CRO) filter of the present disclosure.

FIG. 1 illustrates an example apparatus 100 of the present disclosure. The apparatus 100 may be an optical transceiver device that can transmit light signals and receive light signals. The apparatus 100 may be coupled to and controlled by an integrated chip or circuit such as an application specific integrated circuit (ASIC) chip. The apparatus 100 may be part of a coarse wavelength division multiplexing (CWDM) optical system. The apparatus 100 may be used for half-duplex or full-duplex communications.

In one example, the apparatus 100 may include an optical transmission component 101 (also referred to as an optical transmitter 101) and an optical reception component 103 (also referred to as an optical receiver 103). In one example, the optical transmission component 101 may include a plurality of lasers $102_1$ to $102_n$ (hereinafter also referred to individually as a laser 102 or collectively as lasers 102). Each laser may emit a light having a different wavelength. For example, the laser $102_1$ may emit a light with a wavelength $\lambda_1$, the laser $102_2$ may emit a light with a wavelength $\lambda_2$, the laser $102_3$ may emit a light with a wavelength $\lambda_3$, and the laser $102_n$ may emit a light with a wavelength $\lambda_n$.

In one example, a filter 106 (also referred to as a transmit filter 106) may be positioned over the lasers 102. The filter 106 may have different regions $110_1$ to $110_n$ (also referred to herein individually as a region 110 or collectively as regions 110). Each one of the regions 110 may be associated with a wavelength of one of the lasers 102. For example, the region $110_1$ may allow a light with the wavelength $\lambda_1$ to pass through. The region $110_2$ may allow a light with the wavelength $\lambda_2$ to pass through, but reflect light with the wavelength $\lambda_1$ causing the light with the wavelength $\lambda_1$ to bounce off of the region $110_2$ where lights with wavelengths $\lambda_1$ and $\lambda_2$ are multiplexed. Similarly, the region $110_3$ may allow light with the wavelength $\lambda_3$ to pass through but reflect light with other wavelengths. As a result, light with the wavelength $\lambda_1$ or $\lambda_2$ may bounce off of the region $110_3$ where lights with wavelengths $\lambda_1$, $\lambda_2$ and $\lambda_3$ are multiplexed, and so forth for all the regions 110.

The multiplexed lights with $\lambda_1$ to $\lambda_n$ wavelengths may be transmitted through a passive optical fiber 150 to the optical reception component 103. The optical reception component 103 may include a plurality of photodiodes $104_1$-$104_n$ (also referred to herein individually as a photodiode 104 or collectively as photodiodes 104). The photodiodes 104 may detect the light transmitted by the lasers 102. In one example, there may be a photodiode 104 for each laser 102 in the optical transmission component 101.

In one example, the optical reception component 103 may also include a complementary reverse order (CRO) filter 108. The CRO filter may include a plurality of regions $112_1$ to $112_n$ (also referred to herein individually as a region 112 or collectively as regions 112). Similar to the regions 110 of the filter 106, each one of the regions 112 may allow a light of a particular wavelength through and cause light of other wavelengths to bounce off.

In one example, the order of the regions 112 may be a reverse order of the regions 110 of the filter 106. For example, the regions 110 of the filter 106 may be read from left to right. The region $110_1$ is associated with a wavelength $\lambda_1$, the region $110_2$ is associated with a wavelength $\lambda_2$, the region $110_3$ is associated with a wavelength $\lambda_3$, and the region $110_n$ is associated with a wavelength $\lambda_n$. The regions 112 of the CRO filter 108 may be read from right to left.

The regions 112 of the CRO filter 108 may be in a reverse order relative to the regions 110 of the filter 106. In one example, the term "reverse order" may be defined to mean that the regions of the filter of the transmission component 101 may be reverse of regions of the filter of the optical reception component 103 in a way that the filters complement each other to minimize the end-to-end optical signal losses across the wavelengths that are used. In full-duplex systems, the term "complementary" may be defined to mean that the filter of the transmission component 101 and the filter of the optical reception component 103 in the reverse order coexist within a transceiver in a complementary way, so that the CRO filter 108 can be used on two communicatively coupled transceivers of the same design.

It should be noted that the regions 110 of the filter 106 and the regions 112 of the CRO filter 108 may face each other, as shown in a top view of the filter 106 and the CRO filter 108 in FIG. 5, and discussed below. Thus, it may be easier to see that the regions 112 of the CRO filter 108 are in a reverse order relative to the regions 110 of the filter 106 in FIG. 5. For example, the region $112_n$ is associated with a wavelength $\lambda_n$, the region $112_3$ is associated with a wavelength $\lambda_3$, the region $112_2$ is associated with a wavelength $\lambda_2$, and the region $112_1$ may be associated with a wavelength $\lambda_1$. In one example, the plurality of different regions of the CRO filter 108 in the optical transmission component 103 may be arranged in a decreasing order of the different wavelengths.

In contrast, currently designed filters for the optical reception component 103 may have the same order as the filter 106. As a result, the last region in the filter would be associated with a wavelength $\lambda_1$ and the first region in the filter would be associated with a wavelength $\lambda_n$. As a result, currently designed filters may cause some wavelengths of light to experience a longer optical path length, more bounces (reflections), and therefore more optical power loss than other wavelengths.

However, the CRO filter 108 may allow light transmitted from each of the lasers 102 to have the same number of bounces. As a result, the maximum number of bounces is significantly reduced, thereby also reducing the maximum optical power losses (e.g., in decibels (dB)) in the apparatus 100.

Figure 2:
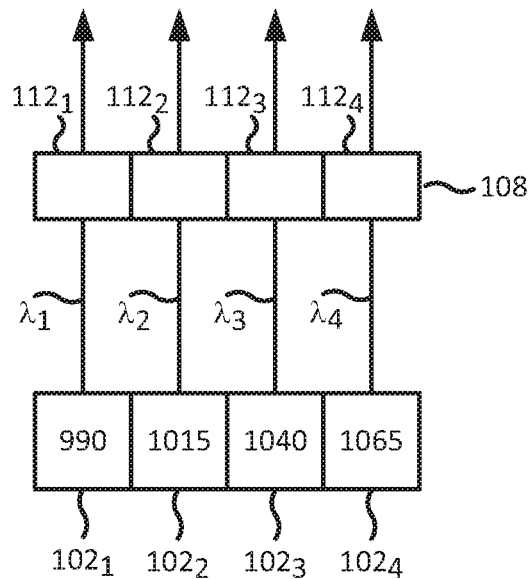
FIG. 2 is a block diagram of an example optical transmitter with the CRO filter of the present disclosure.

FIG. 2 illustrates a block diagram of an example optical transmitter 101. In one example, the optical transmitter 101 may include a plurality of lasers 102, as described above. The lasers 102 may be vertical cavity surface emitting lasers (VCSELs). The lasers 102 may be arranged in an ascending order of transmission wavelengths.

FIG. 2 illustrates an example using four different lasers $102_1$ to $102_4$. The laser $102_1$ may emit light with a wavelength of 990 nanometers (nm), the laser $102_2$ may emit light with a wavelength of 1015 nm, the laser $102_3$ may emit light with a wavelength of 1040 nm, and the laser $102_4$ may emit light with a wavelength of 1065 nm. It should be noted that four lasers 102 are shown as an example and that the optical transmission component 101 may include any number of lasers 102. In addition, the values of the wavelengths of each laser 102 are provided as examples and any ascending order of wavelength values may be used.

In one example, the CRO 108 may be located in the optical transmitter 101 instead of the optical reception component 103, as illustrated in FIG. 1. In other words, the CRO 108 may have a plurality of different regions 112 that are in a reverse order of a filter with the same plurality of different regions of the optical receiver 103.

Each one of the different regions 112 may be associated with a transmission wavelength $\lambda_1$-$\lambda_4$. For example, the region $112_1$ may allow a transmission wavelength $\lambda_1$ to pass through, the region $112_2$ may allow a transmission wavelength $\lambda_2$ to pass through, the region $112_3$ may allow a transmission wavelength $\lambda_3$ to pass through, and the region $112_4$ may allow a transmission wavelength $\lambda_4$ to pass through.

Figure 3:
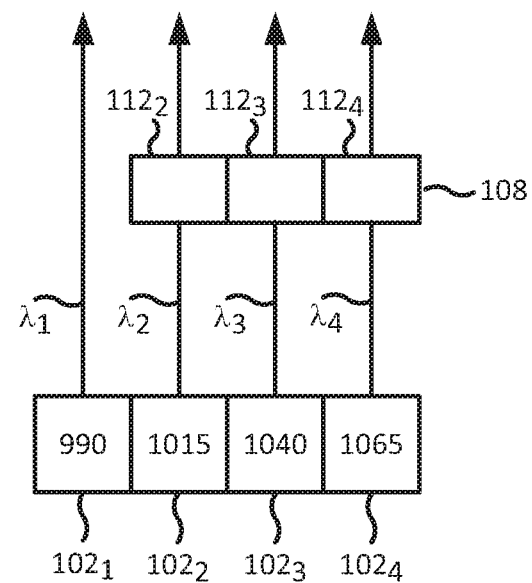
FIG. 3 is a block diagram of another example optical transmitter with a CRO filter of the present disclosure.

FIG. 3 illustrates another example optical transmitter 101. In some examples, the CRO filter 108 may have fewer regions 112 than lasers 102. For example, as shown in FIG. 3, if four lasers 102 are deployed, the CRO filter 108 may include three different regions $112_2$-$112_4$. In other words, the region $112_1$ may be removed over the first laser $102_1$. Said another way, each one of the regions 112 of the CRO filter 108 may be associated with one of the lasers 102 except the laser $102_1$ that is farthest away (e.g., farthest left in FIG. 3) from the optical receiver 103.

Reducing the number of regions 112 in the CRO filter 108 may help further reduce the maximum losses as the light emitted from the laser $102_1$ may incur less loss (or no loss) compared to going through a region 112 of the CRO filter 108. In addition, reducing the number of regions 112 in the CRO filter 108 may reduce the costs associated with building the CRO filter 108.

In some examples, a subset of regions 112 of the CRO filter 108 may be reversed. In other words, the entire sequence of regions 112 of the CRO filter 108 may not necessarily be reversed compared to the sequence of regions of another filter.

For example, referring back to FIG. 1, the wavelengths of light that are known to have the highest losses may be reversed to minimize losses in select lasers 102. For example, the light emitted from the lasers $102_1$ and $102_2$ may be known to have the highest amount of losses. As a result, the regions $112_1$ and $112_2$ of the CRO filter 108 may be reversed. The regions $112_3$-$112_n$ may remain in the same sequence or order as the regions $110_3$-$110_n$ of the filter 106.

Figure 4:
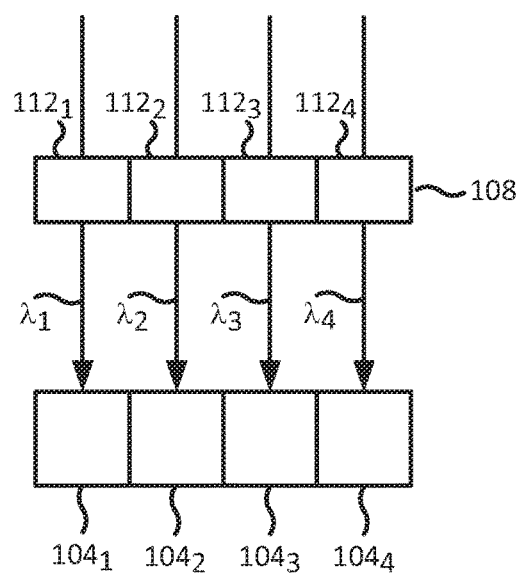
FIG. 4 is a block diagram of an example optical receiver of the present disclosure.

FIG. 4 illustrates a block diagram of an example optical receiver 103. The optical receiver 103 may include a plurality of photodiodes 104. In the example illustrated in FIG. 4, four photodiodes $104_1$-$104_4$ may be deployed. The number of photodiodes 104 may be equal to a number of lasers in an optical transmitter.

In one example, the CRO filter 108 may be located over the photodiodes 104, similar to the optical receiver 103 illustrated in FIG. 1. In one example, the CRO filter 108 may include a plurality of different regions 112 that are in a reverse order of a filter with the same plurality of different regions of the optical transmitter 101. Each one of the different regions 112 may be associated with a different wavelength (e.g., a wavelength of light transmitted by different lasers in the optical transmitter). As a result, the CRO filter 108 in the optical receiver 103 may allow an equal number of bounces for any light transmission from the optical transmitter to the respective photodiode 104.

Figure 5:
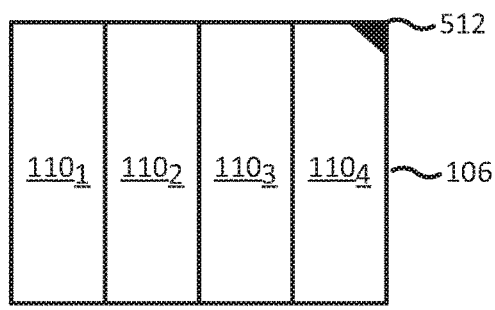
FIG. 5 is a block diagram of different examples of the CRO filter.
Figure 5:
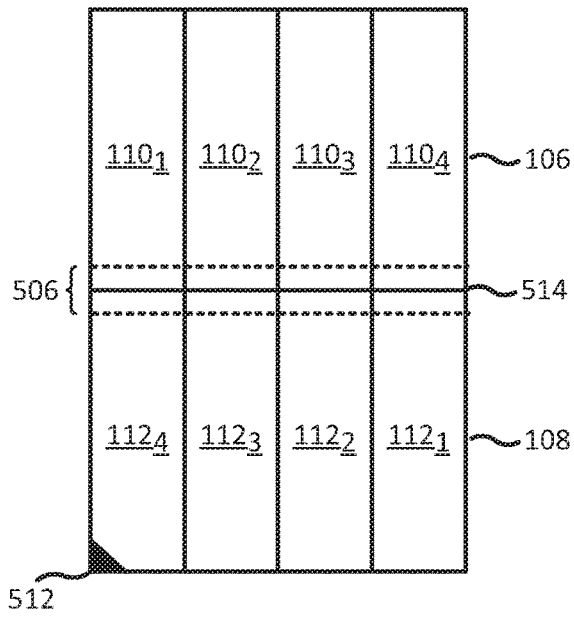

FIG. 5 illustrates different examples 502 and 504 of the filter 106 and the CRO filter 108. In the example 502, the filter 106 and the CRO filter 108 may be two separate independent filters. The CRO filter 108 may be the same filter as the filter 106, but rotated 180 degrees. For example, the filter 106 may have a key 512. In one example, the key 512 may be a notch or a mark that can be used for alignment or orientation. However, it should be noted that the key 512 may be implemented in other ways than a notch. The key 512 may be in the upper right hand corner for the filter 106. The CRO filter 108 may have the key 512 rotated 180 degrees to be in the bottom left hand corner.

As a result, when the filter 106 and the CRO filter 108 are deployed, the regions 112 of the CRO filter 108 are in a reverse order of the regions 110 of the filter 106. For example, FIG. 5 illustrates the regions $110_1$, $110_2$, $110_3$, and $110_4$ from left to right in the filter 106 and the regions $112_4$, $112_3$, $112_2$, and $112_1$ from left to right in the CRO filter 108.

In the example 504, the filter 106 and the CRO filter 108 may be formed as a single monolithic filter. The single monolithic filter may have two sections that form the filter 106 and the CRO filter 108. The two sections may be separated by an easement gap 514. Optical paths may be avoided in the easement gap 514. The easement gap 514 may have a width 506 that is less than 100 microns wide.

The single monolithic filter in the example 504 may also have a key 512. The key 512 may be used to indicate which side is the CRO filter 108 and which side is the filter 106. The single monolithic filter in the example 504 may be used when the lasers 102 and the photodiodes 104 illustrated in FIG. 1 are relatively close to one another. The filter 106 and the CRO filter 108 in the example 502 may be used when the lasers 102 and the photodiodes 104 illustrated in FIG. 1 are relatively far apart from one another.

Figure 6:
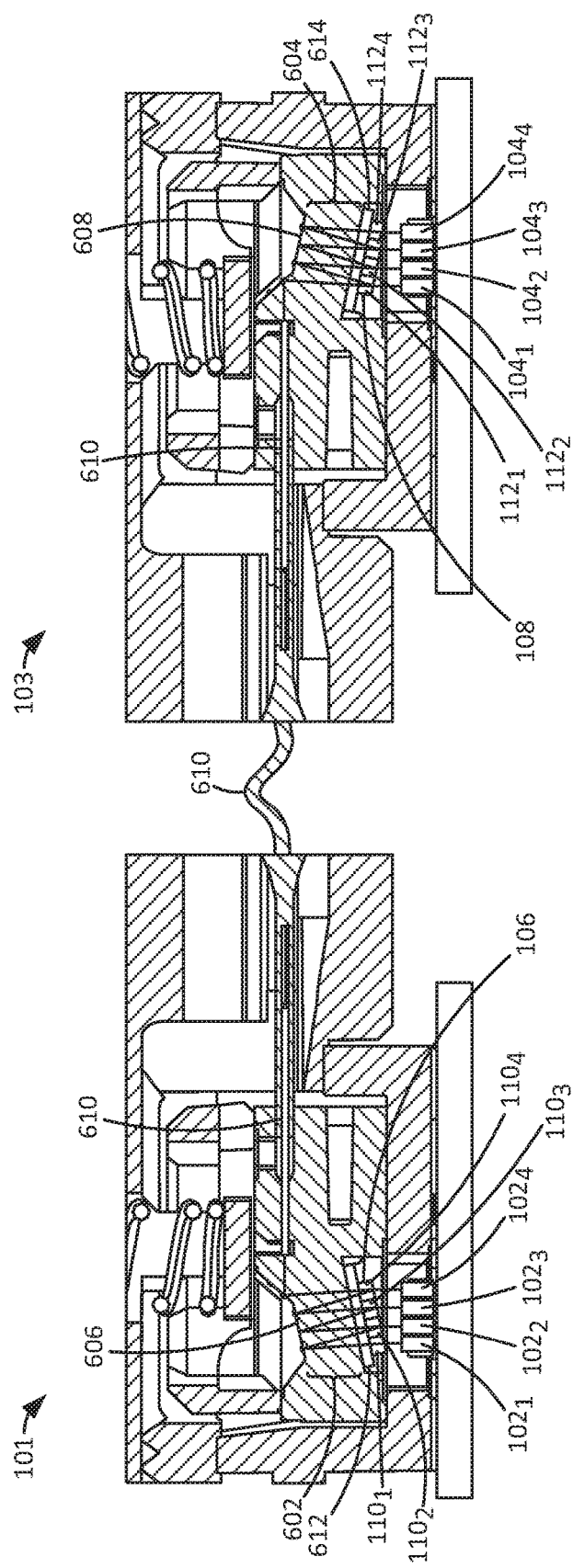
FIG. 6 is a more detailed block diagram of a cross-sectional view of an interconnected optical transceiver assembly having the CRO filter of the present disclosure.

FIG. 6 illustrates a more detailed block diagram of a cross-sectional view of an example interconnected optical transceiver assembly 600. The optical transceiver 600 may include the optical transmission component 101 and the optical reception component 103. The optical transmission component 101 may include four lasers $102_1$-$102_4$. Each one of the lasers 102 may emit light with a different wavelength. For example, the laser $102_1$ may emit light with a wavelength of 990 nm, the laser $102_2$ may emit light with a wavelength 1015 nm, the laser $102_3$ may emit light with a wavelength 1040 nm, and the laser $102_4$ may emit light with a wavelength of 1065 nm. The lasers 102 may be VCSELs.

In one example, the filter 106 may have a plurality of different regions 110, as described above. Each region $110_1$-$110_4$ may be associated with a different wavelength and associated with a respective laser $102_1$-$102_4$. The filter 106 may be tilted or angled relative to the normal plane of the emitted light direction of the lasers 102. The angle may be approximately equal to a critical angle of the regions 110 of the filter to allow the light emitted from the lasers 102 to pass through the respective regions 110.

In one example, the light may enter a region 602 in the optical transmission component 101. In one example, the region 602 may be air. When the region 602 is air, an anti-reflective (AR) coating 612 may be applied to the filter 106. The AR coating 612 may be applied to the transmission side of the filter 106 (e.g., a side that the light exits the filter 106). The AR coating 612 may have a refractive index that matches the air. The AR coating 612 may be formed from materials such as, for example, titanium dioxide, magnesium fluoride, metallic oxides, and the like.

In one example, the region 602 may include relay mirrors formed on a plastic ferrule. In one example, the region 602 may incorporate a lens. For example, the lens may be made of glass or optically clear plastic that has a refractive index that matches the refractive index of the filter 106. In some examples, the AR coating 612 may be used in combination with a lens in the region 602.

In one example, a reflective surface 606 may be located above the filter 106. The reflective surface 606 may be a plurality of reflective surfaces. The reflective surface 606 may be relay lenses with a highly reflective coating or a total internal reflection (TIR) mirror. The reflective surface 606 may bounce the light emitted from the lasers 102 between the different regions 110 of the filter 106 and the reflective surface 606 until the light reaches a passive optical fiber 610. Light emitted from each one of the lasers 102 with different carrier wavelengths may bounce between the reflective surface 606 and the filter 106 until they enter into the passive optical fiber 610.

The lights emitted from the lasers 102 may be transmitted to the optical reception component 103. The lights comprising different carrier wavelengths may then pass through the passive optical fiber 610 and enter the optical reception component 103.

In one example, the optical reception component 103 may include a plurality of photodiodes $104_1$-$104_4$. The photodiodes 104 may be used to receive the light. The light signals may then be translated into a corresponding electrical signal.

In one example, the CRO filter 108 may be located above the photodiodes 104. As noted above, the CRO filter 108 may be switched with the filter 106 to be located over the lasers 102. The CRO filter 108 may have a plurality of regions 112, as described above.

In one example, the light may bounce off of a reflective surface 608 through a region 604. The reflective surface 608 may be a plurality of reflective surfaces. The reflective surface 608 may be relay lenses with a highly reflective coating or a total internal reflection (TIR) mirror. The reflective surface 608 may be similar to the reflective surface 606 in the optical transmission component 101. The region 604 may be similar to the region 602. For example, the region 604 may be air or a lens comprising glass or an optically clear plastic.

When the region 604 is air, an AR coating 614 may be applied to the reception side of the CRO filter 108 (e.g., the side the light enters the CRO filter 108). In some examples, the AR coating 614 may be used in combination with the lens in the region 604.

As noted above, the order of the regions 112 of the CRO filter 108 may be reversed relative to the order of the regions 110 of the filter 106. Thus, the CRO filter 108 may allow light emitted from each laser 102 to have an equal number of bounces to reach a respective photodiode 104. For example, the light emitted from the laser $102_1$ may have eight bounces to reach the corresponding region $112_1$ of the CRO filter 108 and the photodiode $104_1$. The light emitted from the laser $102_2$ may have bounces to reach the corresponding region $112_2$ of the CRO filter 108 and the photodiode $104_2$, and so forth.

As a result, the CRO filter 108 may reduce the maximum possible optical signal power losses in the optical transceiver 600. As discussed above, in previous designs the light emitted from the laser $102_1$ may have 14 bounces when the filter in the optical reception component 103 has regions that are the same order as the regions 110 in the filter 106. However, the CRO filter 108 having regions 112 that have a reverse order of the regions 110 of the filter 106 may allow the light emitted from the lasers 102 to all have the same number of bounces to reach the respective photodiodes 104.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus:
   an optical transmission component, comprising:
   a plurality of lasers, wherein each one of the plurality of lasers emits a different wavelength of light; and
   a transmit filter, wherein the transmit filter comprises a first plurality of regions, each region of the first plurality of regions corresponds to one of the different wavelengths of light emitted by the plurality of lasers; and
   an optical reception component, comprising:
   a plurality of photodiodes; and
   a complementary reverse order (CRO) filter, wherein the CRO filter comprises a second plurality of regions wherein each region of the second plurality of regions corresponds to one of the different wavelengths of light emitted by the plurality of lasers and the second plurality of regions is arranged in a reverse order from the first plurality of regions of the transmit filter such that a wavelength of light corresponding to a region at a farther distance from an optical fiber amongst the first plurality of regions of the transmit filter corresponds to a region in a reversed order at a shorter distance from the optical fiber amongst the second plurality of regions of the CRO filter and an optical path between a respective region from amongst the first plurality of regions of the transmit filter of the optical transmitter and a respective region from amongst the second plurality of regions of the CRO filter of the optical receiver is an equal distance for each of the corresponding different wavelengths of light,
   wherein the transmit filter and the CRO filter comprise a single monolithic filter having an easement gap disposed between the CRO filter and the transmit filter, and the easement gap comprising a width having no optical paths.

2. The apparatus of claim 1, wherein the optical transmission component further comprises a reflective surface located above the transmit filter.

3. The apparatus of claim 1, wherein the first plurality of regions of the transmit filter are arranged in an increasing order of the different wavelengths.

4. The apparatus of claim 3, wherein the second plurality of regions of the CRO filter are arranged in a decreasing order of the different wavelengths.

5. The apparatus of claim 1, further comprising:
   an anti-reflective coating on a transmission side of the transmit filter and the CRO filter.

6. The apparatus of claim 1, wherein the optical transmission component and the optical reception component comprises a coarse wavelength division multiplexing (CWDM) optical system.

7. An optical transmitter, comprising:
   a plurality of lasers, wherein the plurality of lasers are arranged in an ascending order of transmission wavelengths;
   a complementary reverse order (CRO) filter comprising a first plurality of regions, wherein each of the first plurality of regions corresponds to a respective transmission wavelength of the plurality of lasers, wherein the first plurality of regions is in a reverse order of a filter with a second plurality of regions of an optical receiver such that an optical path between the CRO filter of the optical transmitter and the filter of the optical receiver is an equal distance for each of the transmission wavelengths and further wherein each of the optical paths for a corresponding transmission wavelength is from a respective region of the first plurality of regions of the CRO filter to the respective region of the second plurality of regions of the filter for the optical receiver,
   wherein the CRO filter comprises one section of a monolithic filter, the filter of the optical receiver comprises another section of the monolithic filter, the monolithic filter comprising an easement gap disposed between the CRO filter and the filter of the optical receiver wherein no optical paths exist within a width of the easement gap.

8. The optical transmitter of claim 7, wherein a number of the first plurality of regions is less than a number of the plurality of lasers.

9. The optical transmitter of claim 8, wherein the first plurality of regions is associated with each one of the plurality of lasers except a laser farthest away from the optical receiver.

10. The optical transmitter of claim 7, wherein a subset of the first plurality of regions of the CRO filter is in the reverse order of a corresponding subset of the second plurality of regions of the filter.

11. The optical transmitter of claim 7, further comprising:
    a reflective surface located above the CRO filter; and
    a lens having a matching refractive index of the CRO filter located between the reflective surface and the CRO filter.

12. An optical receiver, comprising:
    a plurality of photodiodes, wherein a number of the plurality of photodiodes is equal to a number of lasers of an optical transmitter; and
    a complementary reverse order (CRO) filter comprising a first plurality of regions, wherein each one of the first plurality of regions is associated with a different wavelength of a light transmission, wherein the first plurality of regions are arranged such that an optical path corresponding to each different wavelength of a transmission light between a filter of the optical transmitter and the respective region of the first plurality of regions of the CRO filter of the optical receiver is an equal distance for each different wavelength of the light transmission and another optical path corresponding to each different wavelength of a transmission light from the respective laser of the optical transmitter to a respective photodiode of the plurality of photodiodes is an equal distance for each different wavelength of light,
    wherein the CRO filter comprises one section of a monolithic filter, the filter of the optical transmitter comprises another section of the monolithic filter, the monolithic filter comprising an easement gap disposed between the CRO filter and the filter of the optical transmitter wherein no optical paths exist within a width of the easement gap.

13. The optical receiver of claim 12, wherein the first plurality of regions is in a sequence that is reverse of an order of a second plurality of regions of the filter in the optical transmitter.

14. The optical receiver of claim 13, wherein the CRO filter is the same as the filter and is rotated 180 degrees relative to the filter in the optical transmitter.

15. The optical receiver of claim 12, wherein optical receiver is part of a full-duplex transceiver.

* * * * *